US012592797B2

(12) United States Patent
Bala

(10) Patent No.: US 12,592,797 B2
(45) Date of Patent: Mar. 31, 2026

(54) WAKE-UP SIGNAL WAVEFORM DESIGN

(71) Applicant: Rakuten Symphony, Inc., Tokyo (JP)

(72) Inventor: Erdem Bala, San Mateo, CA (US)

(73) Assignee: RAKUTEN SYMPHONY, INC., Tokyo (JP)

( * ) Notice: Subject to any disclaimer, the term of this patent is extended or adjusted under 35 U.S.C. 154(b) by 340 days.

(21) Appl. No.: 18/021,414

(22) PCT Filed: Jan. 17, 2023

(86) PCT No.: PCT/US2023/010910
§ 371 (c)(1),
(2) Date: Feb. 15, 2023

(87) PCT Pub. No.: WO2024/072477
PCT Pub. Date: Apr. 4, 2024

(65) Prior Publication Data
US 2024/0267169 A1 Aug. 8, 2024

Related U.S. Application Data

(60) Provisional application No. 63/411,292, filed on Sep. 29, 2022.

(51) Int. Cl.
*H04L 5/00* (2006.01)
*H04L 27/20* (2006.01)
(Continued)

(52) U.S. Cl.
CPC ........ *H04L 5/0007* (2013.01); *H04L 27/2082* (2013.01); *H04L 27/2628* (2013.01); *H04W 52/0235* (2013.01)

(58) Field of Classification Search
None
See application file for complete search history.

(56) References Cited

U.S. PATENT DOCUMENTS

| 2016/0269219 A1 | 9/2016 | Wang et al. | |
|---|---|---|---|
| 2018/0184379 A1* | 6/2018 | Liu .................. | H04W 52/0219 |

(Continued)

FOREIGN PATENT DOCUMENTS

| WO | 2018/236062 A1 | 12/2018 |
|---|---|---|

OTHER PUBLICATIONS

Written Opinion of the International Searching Authority issued May 3, 2023, for International Application. No. PCT/US 23/10910.

(Continued)

*Primary Examiner* — Diane L Lo
(74) *Attorney, Agent, or Firm* — Sughrue Mion, PLLC

(57) ABSTRACT

Provided are a system and method of generating a wake up signal, the method including receiving plurality of input samples; performing subcarrier mapping that maps the plurality of input samples to a set of subcarriers, thereby generating a subcarrier mapper output; generating a first orthogonal frequency-division multiplexing (OFDM) signal by mapping at least a portion of the subcarrier mapper output to a first frequency band that corresponds to a first wake up signal symbol; generating a second OFDM signal by mapping at least a portion of the subcarrier mapper output to a second frequency band that corresponds to a second wake up signal symbol; and generating a wake up signal comprising at least a portion of the first OFDM signal to represent the first wake up symbol and at least a portion of second OFDM signal to represent the second wake up signal.

20 Claims, 5 Drawing Sheets

(51) Int. Cl.
H04L 27/26        (2006.01)
H04W 52/02        (2009.01)

(56)                    References Cited

U.S. PATENT DOCUMENTS

| | | | |
|---|---|---|---|
| 2019/0223104 A1 | 7/2019 | Huang et al. | |
| 2020/0059342 A1* | 2/2020 | Sahin | H04L 5/0094 |
| 2021/0368443 A1* | 11/2021 | Park | H04L 27/26134 |
| 2024/0204969 A1* | 6/2024 | Wu | H04L 5/0092 |

OTHER PUBLICATIONS

International Search Report issued May 3, 2023, for International Application. No. PCT/US 23/10910.

* cited by examiner

WAKE-UP SIGNAL WAVEFORM DESIGN

CROSS-REFERENCE TO RELATED APPLICATION

This application is a National Stage of International Application No. PCT/US2023/010910, filed on Jan. 17, 2023, claiming priority based on U.S. Provisional Patent Application No. 63/411,292, filed on Sep. 29, 2022, the disclosure of which is incorporated herein by reference in its entirety.

FIELD

Apparatuses and methods consistent with example embodiments of the present disclosure relate to an orthogonal frequency-division multiplexing (OFDM)-based Frequency Shift Keying (FSK) waveform generation.

BACKGROUND

Low power wake-up radio (WUR) in the related art is a type of receiver that can operate with lower power than a traditional receiver. A user equipment (UE) may have both a conventional receiver and a low power wake-up radio. To save power, the conventional receiver, when applicable (for example, when the UE is in idle mode or DRX mode), may be put in a low power consumption state. In this state, the conventional receiver may be turned off (i.e., not receive or transmit any signal), or may be in an almost-off mode. While the conventional receiver is in this state, the WUR may be in an operating mode and may be monitoring for a wake-up signal (WUS). If the WUS is detected and the WUS indicates to the UE to turn on the conventional receiver, the UE turns on the conventional receiver and may start performing the legacy transmit/receive procedures. For example, it may detect the serving cell, acquire the system information, perform random access, etc.

The two common designs for the waveform used to generate the WUS are ON-OFF keying (OOK) and Frequency Shift Keying (FSK). OOK is adopted in IEEE 802.11ba. In OOK, the waveform includes ON and OFF patterns in time domain and a specific pattern is used to convey information. For example, (ON OFF) may be conveyed by bit "1", while (OFF ON) may be conveyed by bit "0". In FSK, the frequency of the waveform conveys information. For example, if a pulse is transmitted on or around frequency f0, bit "0" is conveyed, and if the pulse is transmitted on or around frequency f1, bit 1 is conveyed.

SUMMARY

According to embodiments, systems and methods are provided for generating an orthogonal frequency-division multiplexing (OFDM)-based Frequency Shift Keying (FSK) waveform.

According to an embodiment, a method of generating a wake up signal, the method performed by at least one processor, is provided. The method includes receiving plurality of input samples, performing, on the plurality of input samples, subcarrier mapping that maps the plurality of input samples to a set of subcarriers, thereby generating a subcarrier mapper output, generating a first orthogonal frequency-division multiplexing (OFDM) signal by mapping at least a portion of the subcarrier mapper output to a first frequency band, wherein the first frequency band corresponds to a first wake up signal symbol, generating a second OFDM signal by mapping at least a portion of the subcarrier mapper output to a second frequency band, wherein the second frequency band corresponds to a second wake up signal symbol, and generating a wake up signal comprising at least a portion of the first OFDM signal to represent the first wake up symbol and at least a portion of second OFDM signal to represent the second wake up signal.

Mapping at least a portion of the subcarrier mapper output to the first frequency band may also include performing, on the subcarrier mapper output, a first inverse discrete Fourier transform (IDFT), and mapping at least a portion of the subcarrier mapper output to the second frequency band may also include performing, on the subcarrier mapper output, a second IDFT.

According to an embodiment, a wake-up signal waveform generator is provided, including: at least one memory configured to store computer program code; and at least one processor configured to access the at least one memory and operate as instructed by the computer program code, wherein the computer program code includes: receiving code configured to cause the at least one processor to receive a plurality of input samples; a performing code configured to cause the at least one processor to perform, on the plurality of input samples, subcarrier mapping that maps the plurality of input samples to a set of subcarriers, thereby generating a subcarrier mapper output; a first generating code configured to cause the at least one processor to generate first orthogonal frequency-division multiplexing (OFDM) signal by mapping at least a portion of the subcarrier mapper output to a first frequency band, wherein the first frequency band corresponds to a first wake up signal symbol; a second generating code configured to cause the at least one process to generate a second OFDM signal by mapping at least a portion of the subcarrier mapper output to a second frequency band, wherein the second frequency band corresponds to a second wake up signal symbol; and a third generating code configured to cause the at least one process to generate a wake up signal comprising at least a portion of the first OFDM signal to represent the first wake up symbol and at least a portion of second OFDM signal to represent the second wake up signal.

According to an embodiment, a non-transitory computer readable medium having instructions stored therein is provided, which when executed by a processor in wake-up signal waveform generator cause the processor to execute a method including: receiving plurality of input samples; performing, on the plurality of input samples, subcarrier mapping that maps the plurality of input samples to a set of subcarriers, thereby generating a subcarrier mapper output; generating a first orthogonal frequency-division multiplexing (OFDM) signal by mapping at least a portion of the subcarrier mapper output to a first frequency band, wherein the first frequency band corresponds to a first wake up signal symbol; generating a second OFDM signal by mapping at least a portion of the subcarrier mapper output to a second frequency band, wherein the second frequency band corresponds to a second wake up signal symbol; and generating a wake up signal comprising at least a portion of the first OFDM signal to represent the first wake up symbol and at least a portion of second OFDM signal to represent the second wake up signal.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
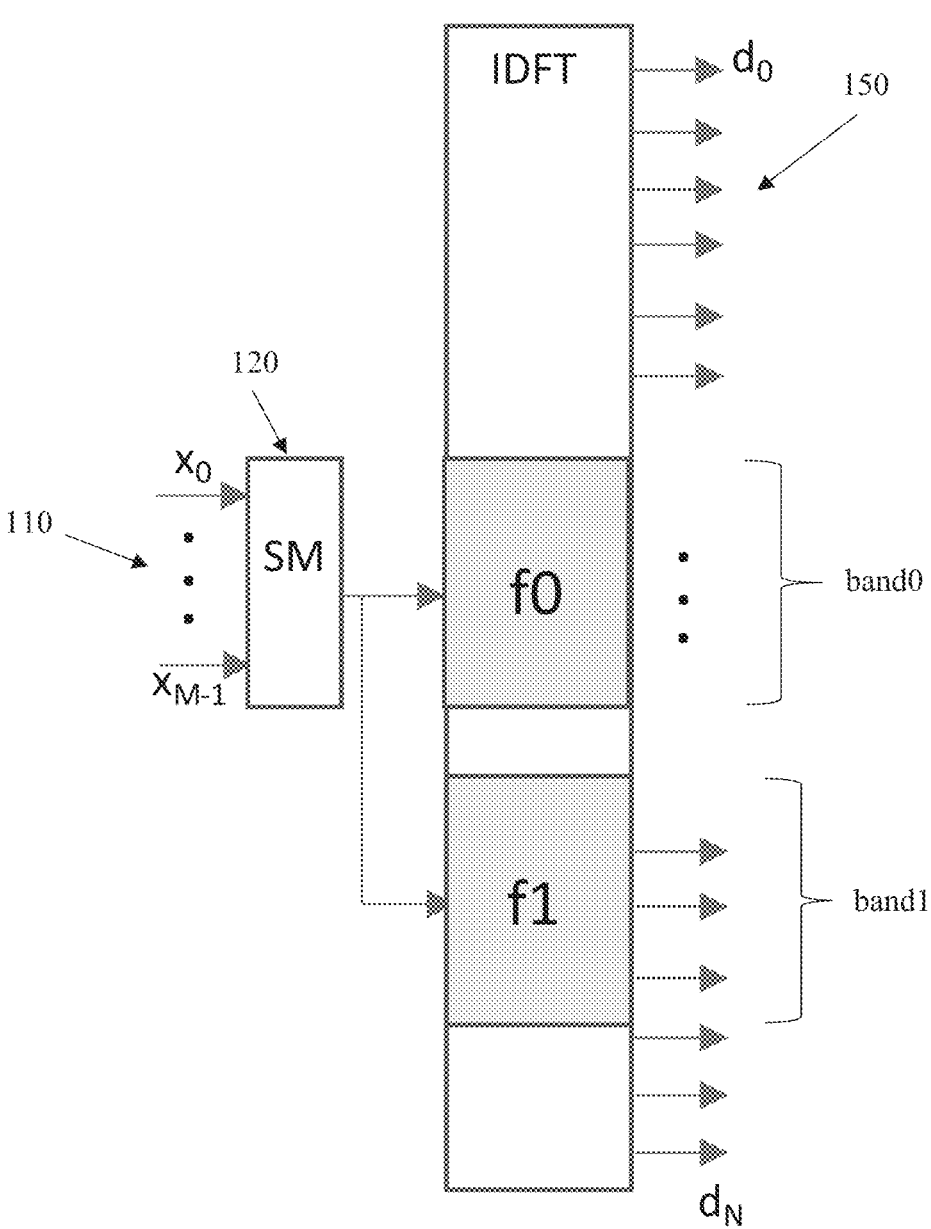
FIG. 1 illustrates a WUS generation using an OFDM transmitter according to an embodiment.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

The related art does not suggest how to generate WUS based on FSK using an OFDM transmitter where one OFDM symbol may be used to generate multiple WUS symbols. Meanwhile, one or more example embodiments provide an OFDM-based FSK waveform generation scheme that can enable using conventional 5G NR transmitters for WUS generation. As a result, power savings may be achieved at the UE side resulting in longer battery life, and conventional 5G NR transmitters can be used for WUS generation.

Waveform Generation

In one method, the WUS may be generated using related art FSK modulation. In another method, the WUS may be generated using an OFDM transmitter as shown in FIG. 1.

According to an example embodiment, a set of M input samples 110 $x_0$ to $x_{M-1}$ are mapped to a set of M subcarriers using the subcarrier mapping (SM) block 120. The input samples 110 may be symbols of binary phase shift keying (BPSK) modulation and/or quadrature phase shift keying (QPSK) modulation. The input samples 110 may be scaled to have different power levels. The input samples 110 may be processed using a frequency domain window before being mapped to the subcarriers. The input samples 110 may also go through a phase change operation, for example, to maintain phase continuity.

The frequency (e.g., the frequency band consisting of one or a plurality of subcarriers) to which the samples 110 are mapped may correspond to one or more WUS symbols. For example, the OFDM signal generated by mapping the inputs 110 to the band at or around f0 (band0) may indicate symbol 0 and the OFDM signal generated by mapping the input to the band at or around f1 (band1) may indicate symbol 1. f0 and f1 may be the mid-point frequency in their respective bands. For example, the bands may contain 12 resource blocks at subcarrier spacing of 15 kHz, corresponding to 2.160 MHz bandwidth. Here, cylic prefix (CP) and/or a guard interval (GI) (e.g., guard interval consisting of zeros) may also be prepended to the inverse discrete Fourier transform (IDFT) output. After CP/GI addition, the signal may be modulated to the carrier frequency and processed by the digital-to-analog conversion before being transmitted.

Figure 2:
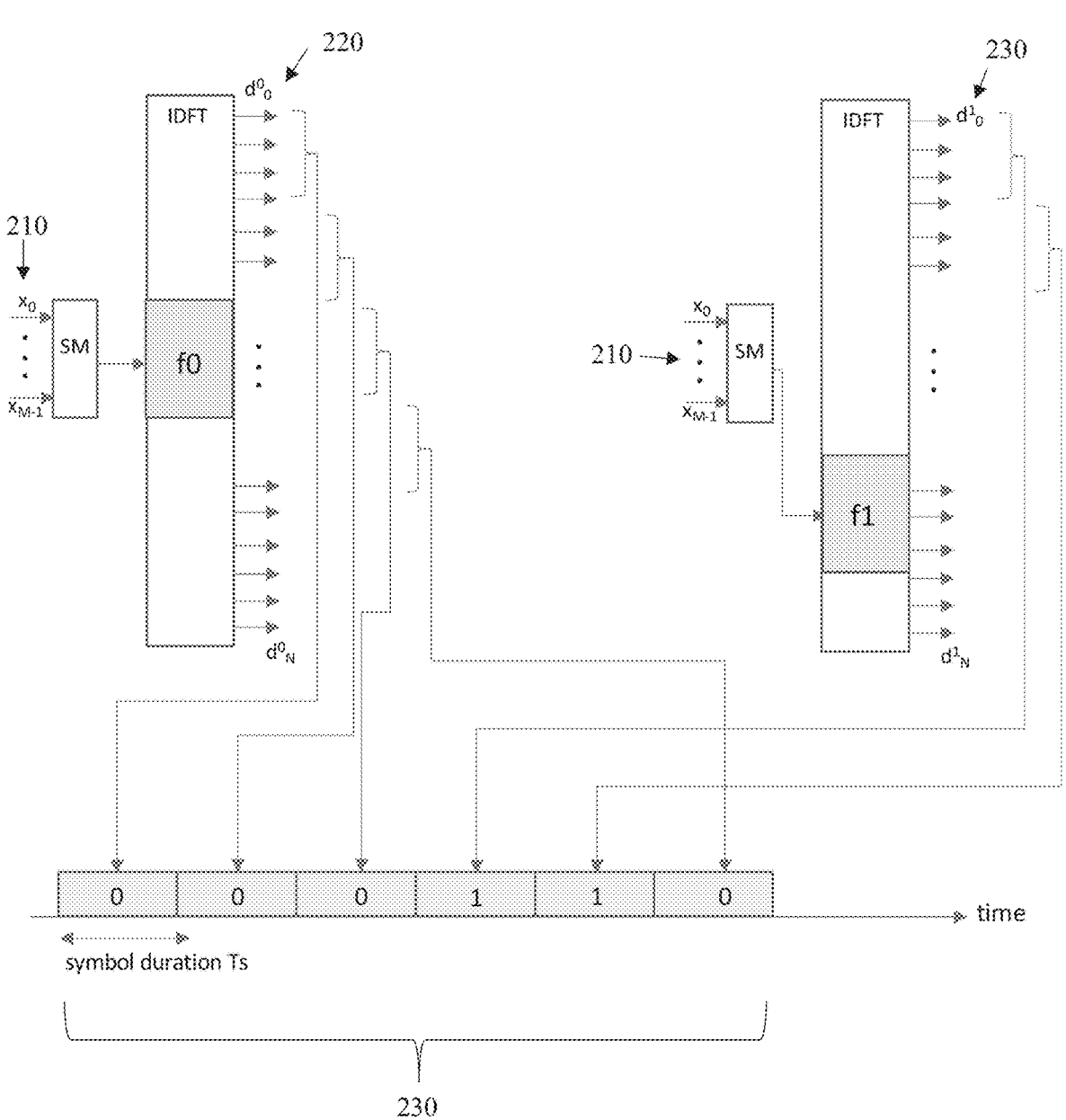
FIG. 2 illustrates WUS symbols generated using an OFDM transmitter according to an embodiment.

In a method according to an example embodiment, instead of all of the IDFT outputs, a subset of the IDFT outputs may be used to indicate one or a plurality of WUS symbols. For example, the IDFT output may consist of N samples 150 as shown in FIG. 1 and n output samples (e.g., n=24 and N=512) may be used to indicate symbols 0 or 1. An example is shown in FIG. 2 and described in the following.

An OFDM signal is generated by mapping the input samples 210 to a frequency band (in an embodiment, the input samples 210 are equivalent to the input samples 110). The signal 220 generated using band0 is denoted as $d^0$ and the signal 230 generated using band1 is denoted as $d^1$. Each signal may contain N samples. As shown in FIG. 2, the sample index is denoted as a subscript.

To transmit symbol 0, n samples of $d^0$ are selected. To transmit symbol 1, n samples of $d^1$ are selected. A cylic prefix or a guard interval may be added to the n-point signal. The signal then may be modulated and converted to an analog signal.

To transmit the next symbol, the same set of n samples or another set of n samples may be selected. For example, in FIG. 2, the n samples are consecutive. In one method, indices of the n samples may be calculated as mod (n×k+of: n×(k+1)−1+of, N) where mod denotes the modular operation, k is the symbol index starting from 0 and of is an integer offset between 0 and N (including 0 and N).

In one method, if all N samples of the IDFT output are used to indicate WUS symbols, a new set of N samples may be generated using a new set of M input samples and the new symbols may be indicated using the new N samples. In another method, the same N samples may be used to transmit a whole WUS. The M input samples mapped to different bands may be different.

The above may be extended to more than two bands. When the number of bands is K, then each n samples may be used to indicate log 2K bits.

The example in FIG. 2 contains symbols 230 shown as [0; 0; 0; 1; 1; 0]. Assuming n=12, the IDFT output samples 220 and 230 used to indicate the symbols may be determined as $[d^0_0$ to $d^0_{11}; d^0_{12}$ to $d^0_{23}; d^0_{24}$ to $d^0_{35}; d^1_0$ to $d^1_1; d^1_{12}$ to $d^1_{24};$ $d^0_{36}$ to $d^0_{47}]$. Note that when n<N, the symbol duration is smaller than the OFDM symbol duration. One or more symbols may be used to encode an information bit. For example, information bit "0" may be encoded by symbols [1 0] and information bit "1" may be encoded by symbols [0 1].

A similar approach may be used to generate an on-off keying (OOK) signal. In an OOK signal, symbol 1 may be indicated using a subset of the IDFT output and symbol 0 may be indicated with no signal. The band used to generate the OFDM signal for OOK may be different than the bands for FSK. For example, the band used for OOK may be the combination of band0 and band1.

In another method according to an example embodiment, both FSK and OOK may be used to indicate the WUS symbols. In this method, to represent symbol 1 in time domain as in OOK, a signal may be generated using either band0 or band1. Symbol 0 may be represented with no signal. At the wake-up receiver, first time domain energy of the received signal may be detected. If the energy is above a threshold, then the WUS determines the signal to represent symbol 1. Then the frequency of the signal may be determined to be either f0 or f1 (e.g., by filtering and energy detection) where, as in FSK, f0 may indicate symbol 0 and f1 may indicate symbol 1. If the received signal energy is below a threshold, it is determined to represent symbol 0 and no further frequency domain analysis is required. In general, as in this example, symbols may be represented by the time domain energy and/or the frequency content of the signal.

The WUS may be transmitted in the same channel as other legacy channels. For example, a gNB may allocate 4 MHz of a 20 MHz channel to the WUS and use the remaining part of the channel for legacy NR channels such as the downlink shared channel. Since WUS frames may be transmitted with a duty cycle, the 4 MHz may not be allocated to WUS at all times but only when WUS frames are transmitted. The subcarrier spacing (SCS) used to generate the WUS may differ, for example, based on the SCS of the channel in which the WUS is transmitted. As an example, the SCS may be 15 kHz or 30 kHz in Frequency Range 1 (FR1).

In one method according to an example embodiment, the WUS input samples 210 to the IDFT may be determined at least based on the SCS. Assume that when the SCS is 30 kHz, then set of input samples 210 is given by the vector x. When the SCS is 15 kHz, the number of subcarriers (assuming the WUS bandwidth does not change) used to map the input is going to be two times more. The input in this case, denoted as x' may be determined by one of the following: (i) upsample x by the ratio of SCSs, i.e., 30 kHz/15 kHz=2, x'=upsample(x,2); (ii) x' is a repetition of x, e.g., x'=[x x]; and (iii)=x'=[x x*] where * denotes conjugation.

An information bit may consist of a plurality WUS symbols, i.e., an information bit may be encoded using the WUS symbols. For example, information bit "0" may be represented by WUS symbols [1 0] and information bit "1" may be represented by WUS symbols [0 1]. In another example, "0": [1 0 1 0] and "1": [01 0 1].

Figure 3:
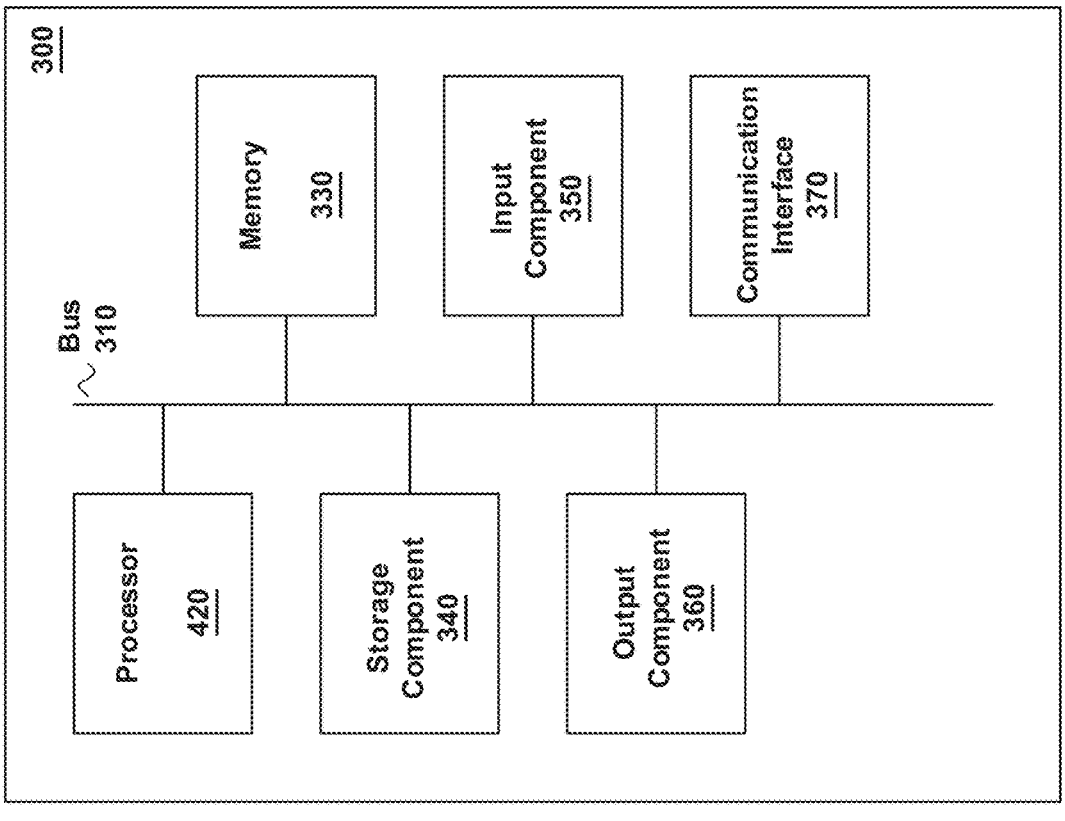
FIG. 3 is a diagram of an example network device in accordance with various embodiments of the present disclosure.

Turning to FIG. 3, the methods and processes described herein may be carried out on device 300, which may correspond to any type of known computer, server, or data processing device. For example, the device 300 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 3, the device 300 may include a set of components, such as a processor 320, a memory 330, a storage component 340, an input component 350, an output component 360, and a communication interface 370.

The bus 310 may comprise one or more components that permit communication among the set of components of the device 300. For example, the bus 310 may be a communication bus, a cross-over bar, a network, or the like. Although the bus 310 is depicted as a single line in FIG. 3, the bus 310 may be implemented using multiple (two or more) connections between the set of components of device 300. The disclosure is not limited in this regard.

The device 300 may comprise one or more processors, such as the processor 320. The processor 320 may be implemented in hardware, firmware, and/or a combination of hardware and software. For example, the processor 320 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general-purpose processor may be a microprocessor, or any conventional processor, controller, microcontroller, or state machine. The processor 320 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 320 may control overall operation of the device 300 and/or of the set of components of device 300 (e.g., the memory 330, the storage component 340, the input component 350, the output component 360, the communication interface 370).

The device 300 may further comprise the memory 330. In some embodiments, the memory 330 may comprise a random-access memory (RAM), a read only memory (ROM), an electrically erasable programmable ROM (EEPROM), a flash memory, a magnetic memory, an optical memory, and/or another type of dynamic or static storage device. The memory 330 may store information and/or instructions for use (e.g., execution) by the processor 320.

The storage component 340 of device 300 may store information and/or computer-readable instructions and/or code related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 300 may further comprise the input component 350. The input component 350 may include one or more components that permit the device 300 to receive information, such as via user input (e.g., a touch screen, a keyboard, a keypad, a mouse, a stylus, a button, a switch, a microphone, a camera, and the like). Alternatively, or additionally, the input component 350 may include a sensor for sensing information (e.g., a global positioning system (GPS) component, an accelerometer, a gyroscope, an actuator, and the like).

The output component 360 of device 300 may include one or more components that may provide output information from the device 300 (e.g., a display, a liquid crystal display (LCD), light-emitting diodes (LEDs), organic light emitting diodes (OLEDs), a haptic feedback device, a speaker, and the like).

The device 300 may further comprise the communication interface 370. The communication interface 370 may include a receiver component, a transmitter component, and/or a transceiver component. The communication interface 170 may enable the device 300 to establish connections and/or transfer communications with other devices (e.g., a server, another device). The communications may be affected via a wired connection, a wireless connection, or a combination of wired and wireless connections. The communication interface 370 may permit the device 300 to receive information from another device and/or provide information to another device. In some embodiments, the communication interface 370 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively, or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 370 may include an Ethernet interface, an optical interface, a coaxial interface, an infrared interface, a radio frequency (RF) interface, or the like.

The device 300 may perform one or more processes described herein. The device 300 may perform operations based on the processor 320 executing computer-readable instructions and/or code that may be stored by a non-transitory computer-readable medium, such as the memory 330 and/or the storage component 340. A computer-readable medium may refer to a non-transitory memory device. A memory device may include memory space within a single physical storage device and/or memory space spread across multiple physical storage devices. Some embodiments may relate to a system, a method, and/or a computer readable medium at any possible technical detail level of integration. Further, one or more of the above components described herein may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor 320 of a general purpose computer, special purpose computer, or other programmable data processing apparatus to produce a machine, such that the instructions, which execute via the processor 320 of the computer or other programmable data processing apparatus, create means for implementing the functions/acts specified in the flowchart and/or block diagram block or blocks. These computer readable program instructions may also be stored in a computer readable storage medium such as memory 330 that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Computer-readable instructions and/or code may be read into the memory 330 and/or the storage component 340 from another computer-readable medium or from another device via the communication interface 370. The computer-readable instructions and/or code stored in the memory 330 and/or storage component 340, if or when executed by the processor 320, may cause the device 300 to perform one or more processes described herein.

Alternatively, or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of (one or more) components shown in FIG. 3 may perform one or more functions described as being performed by another set of components shown in FIG. 3.

Figure 4:
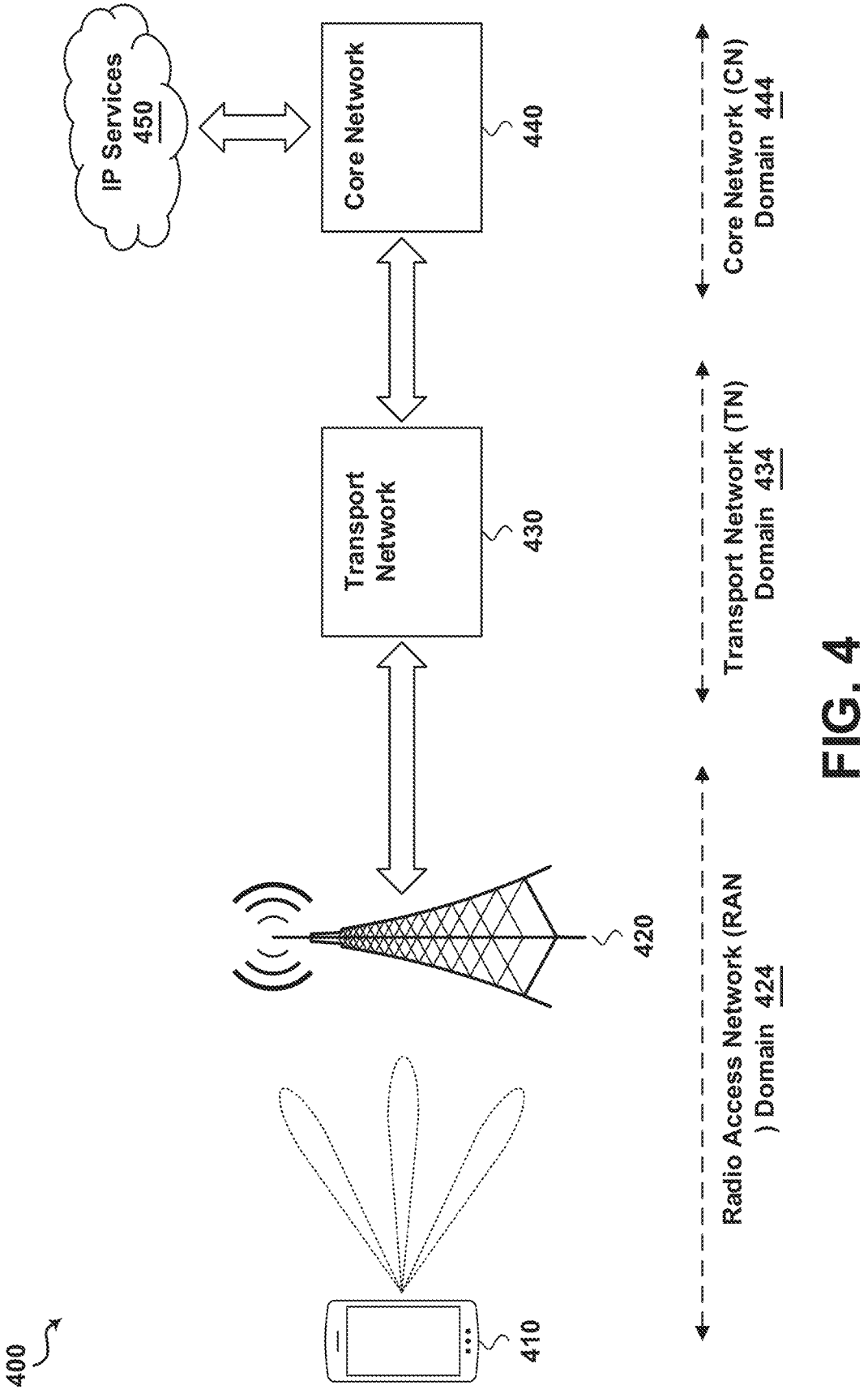
FIG. 4 is a schematic diagram of an example wireless communications system, in accordance with various embodiments of the present disclosure.

FIG. 4 is a diagram illustrating an example of a wireless communications system, according to various embodiments of the present disclosure. The wireless communications system 400 (which may also be referred to as a wireless wide area network (WWAN)) may include one or more user equipment (UE) 410, one or more base stations 420, at least one transport network 430, and at least one core network 440. The device 300 (FIG. 3) may be incorporated in the UE 410 or the base station 420.

The one or more UEs 410 may access the at least one core network 440 and/or IP services 450 via a connection to the one or more base stations 420 over a RAN domain 424 and through the at least one transport network 430. Examples of UEs 410 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 410 may be referred to as Internet-of-Things (IoT) devices (e.g., parking meter, gas pump, toaster, vehicles, heart monitor, etc.). The one or more UEs 410 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 420 may wirelessly communicate with the one or more UEs 410 over the RAN domain 424. Each base station of the one or more base stations 420 may provide communication coverage to one or more UEs 410 located within a geographic coverage area of that base station 420. In some embodiments, as shown in FIG. 4, the base station 420 may transmit one or more beamformed signals to the one or more UEs 410 in one or more transmit directions. The one or more UEs 410 may receive the beamformed signals from the base station 420 in one or more receive directions. Alternatively, or additionally, the one or more UEs 410 may transmit beamformed signals to the base station 420 in one or more transmit directions. The base station 420 may receive the beamformed signals from the one or more UEs 410 in one or more receive directions.

The one or more base stations 420 may include macrocells (e.g., high power cellular base stations) and/or small cells (e.g., low power cellular base stations). The small cells may include femtocells, picocells, and microcells. A base station 420, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

The one or more base stations 420 may be configured to interface (e.g., establish connections, transfer data, and the like) with the at least one core network 440 through at least one transport network 430. In addition to other functions, the one or more base stations 420 may perform one or more of the following functions: transfer of data received from the one or more UEs 410 (e.g., uplink data) to the at least one core network 440 via the at least one transport network 430, transfer of data received from the at least one core network 440 (e.g., downlink data) via the at least one transport network 430 to the one or more UEs 410.

The transport network 430 may transfer data (e.g., uplink data, downlink data) and/or signaling between the RAN domain 424 and the CN domain 444. For example, the transport network 430 may provide one or more backhaul links between the one or more base stations 420 and the at least one core network 440. The backhaul links may be wired or wireless.

The core network 440 may be configured to provide one or more services (e.g., enhanced mobile broadband (eMBB), ultra-reliable low-latency communications (URLLC), and massive machine type communications (mMTC), etc.) to the one or more UEs 410 connected to the RAN domain 424 via the TN domain 434. Alternatively, or additionally, the core network 440 may serve as an entry point for the IP services 450. The IP services 450 may include the Internet, an intranet, an IP multimedia subsystem (IMS), a streaming service (e.g., video, audio, gaming, etc.), and/or other IP services.

Figure 5:
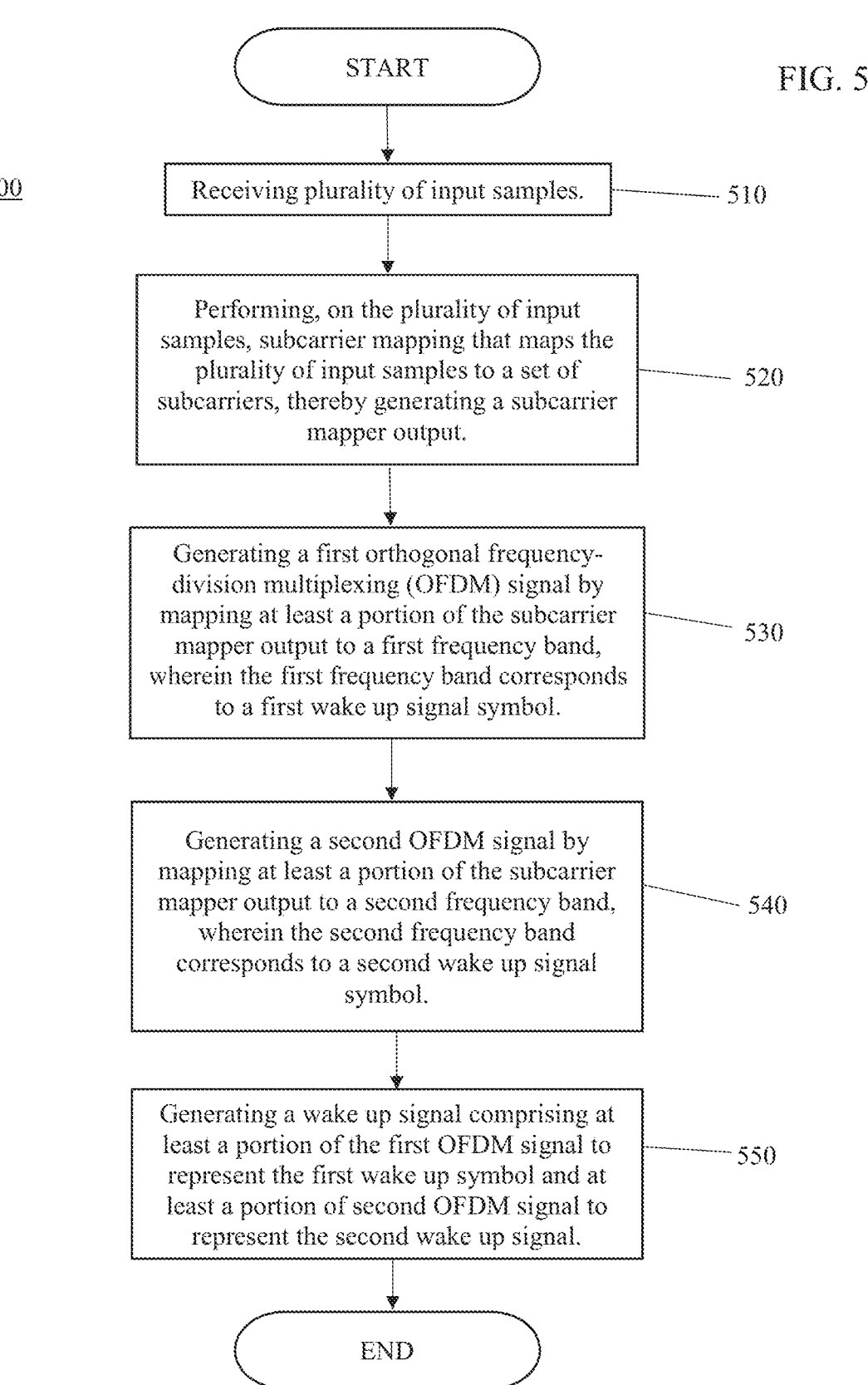
FIG. 5 is a flowchart illustrating a method of generating a WUS in accordance with various embodiments of the present disclosure.

FIG. 5 shows a flow chart demonstrating a method 500 of generating a wake up signal according to an embodiment. Specifically, the method includes operation 510 wherein a wake up signal generator receives of a plurality of input samples. In operation 520, subcarrier mapping of the received plurality of input samples maps the plurality of input samples to a set of subcarriers, which results in a subcarrier mapper output. In operation 530, a first OFDM signal is generated by mapping at least a portion of the subcarrier mapper output (generated in operation 520) to a first frequency band, wherein the first frequency band corresponds to a first wake up signal symbol. In operation 540, a second OFDM signal is generated by mapping at least a portion of the subcarrier mapper output (generated in operation 520) to a second frequency band, wherein the second frequency band corresponds to a second wake up signal symbol. Finally, in operation 550, a wake up signal is generated comprising at least a portion of the first OFDM signal (generated in operation 530) to represent the first wake up symbol and at least a portion of the second OFDM signal (generated in operation 540) to represent the second wake up signal.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of generating a wake up signal, the method performed by at least one processor and comprising:
   receiving a plurality of input samples;

performing, on the plurality of input samples, subcarrier mapping that maps the plurality of input samples to a set of subcarriers, thereby generating a subcarrier mapper output;

generating a first orthogonal frequency-division multiplexing (OFDM) signal by mapping at least a portion of the subcarrier mapper output to a first frequency band, wherein the first frequency band has a predetermined correspondence to a first wake up signal symbol;

generating a second OFDM signal by mapping at least a portion of the subcarrier mapper output to a second frequency band, different from the first frequency band, wherein the second frequency band has a predetermined correspondence to a second wake up signal symbol; and generating a wake up signal comprising at least a portion of the first OFDM signal to represent the first wake up signal symbol and at least a portion of the second OFDM signal to represent the second wake up signal symbol.

2. The method of claim 1, wherein mapping at least a portion of the subcarrier mapper output to the first frequency band comprises performing, on the subcarrier mapper output, a first inverse discrete Fourier transform (IDFT), and mapping at least a portion of the subcarrier mapper output to the second frequency band comprises performing, on the subcarrier mapper output, a second IDFT.

3. The method of claim 2, wherein generating the first OFDM signal further comprises prepending at least one of a cyclic prefix (CP) and a guard interval to an output of the first IDFT, and generating the second OFDM signal further comprises prepending at least one of a cyclic prefix (CP) and a guard interval to an output of the second IDFT.

4. The method of claim 3, further comprising:
   modulating the wake up signal to a carrier frequency;
   processing the wake up signal using a digital-to-analog converter; and
   transmitting the modulated analog wake up signal.

5. The method of claim 1, wherein the plurality of input samples comprise at least one of symbols of binary phase shift keying (BPSK) modulation and symbols of quadrature phase shift keying (QPSK) modulation.

6. The method of claim 1, further comprising:
   processing the plurality of input samples using a frequency domain window prior to performing subcarrier mapping.

7. The method of claim 6, further comprising:
   performing a phase change operation on the plurality of input samples prior to performing subcarrier mapping.

8. A wake-up signal waveform generator, comprising:
   at least one memory configured to store computer program code; and
   at least one processor configured to access the at least one memory and operate as instructed by the computer program code, the computer program code including:
      receiving code configured to cause the at least one processor to receive a plurality of input samples;
      a performing code configured to cause the at least one processor to perform, on the plurality of input samples, subcarrier mapping that maps the plurality of input samples to a set of subcarriers, thereby generating a subcarrier mapper output;
      a first generating code configured to cause the at least one processor to generate first orthogonal frequency-division multiplexing (OFDM) signal by mapping at least a portion of the subcarrier mapper output to a first frequency band, wherein the first frequency band has a predetermined correspondence to a first wake up signal symbol;

a second generating code configured to cause the at least one process to generate a second OFDM signal by mapping at least a portion of the subcarrier mapper output to a second frequency band, different from the first frequency band, wherein the second frequency band has a predetermined correspondence to a second wake up signal symbol; and a third generating code configured to cause the at least one process to generate a wake up signal comprising at least a portion of the first OFDM signal to represent the first wake up signal symbol and at least a portion of the second OFDM signal to represent the second wake up signal symbol.

9. The wake-up signal waveform generator of claim 8, wherein the first generating code further comprises code configured to cause the at least one processor to perform, on at least a portion of the subcarrier mapper output, a first inverse discrete Fourier transform (IDFT), and wherein the second generating code further comprises code configured to cause the at least one processor to perform, on at least a portion of the subcarrier mapper output, a second IDFT.

10. The wake-up signal waveform generator of claim 9, wherein the first generating code further comprises code configured to cause the at least one processor to prepend at least one of a cyclic prefix (CP) and a guard interval to an output of the first IDFT, and wherein the second generating code further comprises code configured to cause the at least one processor to prepend at least one of a cyclic prefix (CP) and a guard interval to an output of the second IDFT.

11. The wake-up signal waveform generator of claim 10, further comprising a transmitter, wherein the computer program code further includes:

modulation code configured to cause the at least one processor to modulate the wake up signal to a carrier frequency;

conversion code configured to cause the at least one processor to convert the wake up signal from a digital signal to an analog signal; and transmitting code configured to cause the at least one processor to transmit the modulated analog wake up signal to be transmitted by the transmitter.

12. The wake-up signal waveform generator of claim 8, wherein the plurality of input samples comprise at least one of symbols of binary phase shift keying (BPSK) modulation and quadrature phase shift keying (QPSK) modulation.

13. The wake-up signal waveform generator of claim 8, wherein the computer program code further includes processing code configured to cause the at least one processor to process the plurality of input samples using a frequency domain window prior to performing subcarrier mapping.

14. The wake-up signal waveform generator of claim 13, wherein the computer program code further includes phase change code configured to cause the at least one processor to perform a phase change operation on the plurality of input samples prior to performing subcarrier mapping.

15. A non-transitory computer readable medium having instructions stored therein, which when executed by a processor in wake-up signal waveform generator cause the processor to execute a method comprising:

receiving plurality of input samples;

performing, on the plurality of input samples, subcarrier mapping that maps the plurality of input samples to a set of subcarriers, thereby generating a subcarrier mapper output;

generating a first orthogonal frequency-division multiplexing (OFDM) signal by mapping at least a portion of the subcarrier mapper output to a first frequency band, wherein the first frequency band has a predetermined correspondence to a first wake up signal symbol;

generating a second OFDM signal by mapping at least a portion of the subcarrier mapper output to a second frequency band, different from the first frequency band, wherein the second frequency band has a predetermined correspondence to a second wake up signal symbol; and generating a wake up signal comprising at least a portion of the first OFDM signal to represent the first wake up signal symbol and at least a portion of the second OFDM signal to represent the second wake up signal symbol.

16. The non-transitory computer readable medium of claim 15, wherein mapping at least a portion of the subcarrier mapper output to the first frequency band comprises performing, on the subcarrier mapper output, a first inverse discrete Fourier transform (IDFT), and mapping at least a portion of the subcarrier mapper output to the second frequency band comprises performing, on the subcarrier mapper output, a second IDFT.

17. The non-transitory computer readable medium of claim 16, wherein generating the first OFDM signal further comprises prepending at least one of a cyclic prefix (CP) and a guard interval to an output of the first IDFT, and generating the second OFDM signal further comprises prepending at least one of a cyclic prefix (CP) and a guard interval to an output of the second IDFT.

18. The non-transitory computer readable medium of claim 17, wherein the method further comprises:

modulating the wake up signal to a carrier frequency;

processing the wake up signal using a digital-to-analog converter; and transmitting the modulated analog wake up signal.

19. The non-transitory computer readable medium of claim 15, wherein the plurality of input samples comprise at least one of symbols of binary phase shift keying (BPSK) modulation and symbols of quadrature phase shift keying (QPSK) modulation.

20. The non-transitory computer readable medium of claim 15, wherein the method further comprises:

processing the plurality of input samples using a frequency domain window prior to performing subcarrier mapping; and performing a phase change operation on the plurality of input samples prior to performing subcarrier mapping.

* * * * *